United States Patent
Bardi et al.

(10) Patent No.: US 8,489,241 B2
(45) Date of Patent: Jul. 16, 2013

(54) CONTROLLING A WASTE COMBUSTION PROCESS

(75) Inventors: Silvia Bardi, Birmenstorf (CH); Alessandro Astolfi, London (GB)

(73) Assignee: ABB Technology AG, Zürich (CH)

( * ) Notice: Subject to any disclaimer, the term of this patent is extended or adjusted under 35 U.S.C. 154(b) by 1330 days.

(21) Appl. No.: 11/714,151

(22) Filed: Mar. 6, 2007

(65) Prior Publication Data

US 2008/0053348 A1 Mar. 6, 2008

(30) Foreign Application Priority Data

Mar. 9, 2006 (EP) .................................... 06405102

(51) Int. Cl.
*F23N 5/18* (2006.01)

(52) U.S. Cl.
USPC ............... 700/274; 700/266; 702/31; 702/32; 110/186; 110/191; 110/103; 110/101 C

(58) Field of Classification Search
USPC ............... 700/266, 274; 702/31, 32; 110/186, 110/191, 103, 101 C
See application file for complete search history.

(56) References Cited

U.S. PATENT DOCUMENTS

| | | | | |
|---|---|---|---|---|
| 4,015,546 A | * | 4/1977 | Paules | 110/187 |
| 4,181,504 A | * | 1/1980 | Camacho | 48/197 R |
| 4,528,918 A | * | 7/1985 | Sato et al. | 110/347 |
| 4,838,183 A | | 6/1989 | Tsaveras et al. | |
| 5,606,924 A | | 3/1997 | Martin et al. | |
| 6,644,222 B1 | | 11/2003 | van Kessel et al. | |
| 6,712,012 B1 | | 3/2004 | van Kessel | |
| 2003/0010269 A1 | | 1/2003 | Schirmer et al. | |
| 2004/0191712 A1 | * | 9/2004 | Thomson et al. | 431/12 |

FOREIGN PATENT DOCUMENTS

| | | |
|---|---|---|
| EP | 0 919 770 A1 | 6/1999 |
| EP | 1 489 355 A1 | 12/2004 |
| EP | 1 589 283 A1 | 10/2005 |
| WO | 03/102472 A1 | 12/2003 |

OTHER PUBLICATIONS

European Search Report dated May 23, 2006.
B. Krause et al., A neuro-fuzzy adaptive control strategy for refuse incineration plants, Fuzzy Sets and Systems 63 (1994) pp. 329-338 North-Holland.

* cited by examiner

*Primary Examiner* — Brian R Gordon
*Assistant Examiner* — Shogo Sasaki
(74) *Attorney, Agent, or Firm* — Buchanan Ingersoll & Rooney PC

(57) ABSTRACT

An exemplary method is disclosed for controlling on-line the steam output of a waste incineration plant that is fed with waste of varying composition. Process or system quantities ($u_2$, $u_3$, $x_{GC}$, $x_{LL}$, $w_0$) can be measured repeatedly, at different times during operation of the plant, and a relation with linear parameters ($\theta_i$) as coefficients of non-linear expressions ($\phi_i$) of the process quantities can be established by evaluating the measurements. From this relation, an optimal waste feed rate to obtain a desired steam output ($\dot{M}_{steam}$) can be determined and applied to a waste feed actuator of the waste incineration plant.

6 Claims, 2 Drawing Sheets

CONTROLLING A WASTE COMBUSTION PROCESS

FIELD

The present disclosure relates to the field of waste combustion.

BACKGROUND OF THE INVENTION

Waste is any type of residual material that remains after any human activity, such as production and consumption of goods or the construction of buildings and traffic ways. The majority of the residual materials are, except for their pure mass and volume, not a potential threat to the environment, nevertheless their correct treatment can help to minimize or avoid associated long-term risks. A sophisticated municipal waste management also helps to reduce the costs of waste treatment and to avoid the destruction of large areas which otherwise would be needed for waste dumping. Hence, the thermal treatment of waste, i.e. the waste incineration or combustion, is an indispensable part of any municipal waste management concept. Incineration is understood as the deliberately initiated, controlled and, in the wider sense, observed, self-sustaining oxidation of any substance. Like in any combustion of solid fuels, flue gases and ashes are the products of such waste incineration processes. Ashes are residual matters of different compositions that contain mainly silicon oxide and other minerals. Due to their chemical inertia they are often used for landfills and for civil engineering.

Municipal and industrial waste is treated in waste incineration plants in order to reduce the volume of the waste to be deposited and in order to transform environmentally hazardous components of the waste into harmless compounds. The increasing amount of waste to be treated leads to the design of incineration plants with multiple tracks, which are able to incinerate several ten tons of waste per hour. So-called waste-to-energy plants do not just burn the waste to ashes, they also use the combustion energy to generate steam, e.g. for district heating, and/or electricity and thus improve the overall efficiency of the plant.

The sophisticated installations for flue gas and ash treatment as well as energy conversion increase the complexity of the plants and call for a suitable control technique. However, there are no adequate overall control schemes available so far to supplant an experienced operator, owing basically to the complex chemical processes and the unsteady fuel qualities resulting in fluctuations in combustion temperature and flue gas composition and flow. The variability of the waste composition relates to, in particular, the heating value or the moisture content of the waste, or the amount of sand, gravel or other non-combustible materials, such as metals, in the waste.

The most significant control parameters which can be used to influence the combustion process in waste incineration plants are the mass flows of primary and secondary combustion air, the air temperature, the amount of returned flue gas, the amount of waste or fuel fed and the transportation speed or the stoking speed of a grate. These parameters have to be optimized according to expected and unexpected variations in water content and heating value of the waste, with the objective to maximize the amount of waste that can be treated or the amount of steam that can be generated, and/or to minimize the amount of air pollutant emissions. In many industrial application the different control variables are controlled independently one from the other, by means of single loops and PID controllers.

The recent introduction of infrared cameras or similar devices has given access to internal or process states of the waste combustion process such as a waste temperature or a flame temperature. According to the U.S. Pat. No. 5,606,924, the combustion process may be regulated in response to a temperature distribution of the fuel mass determined by an infrared camera, the oxygen content detected in the flue gas, or a generated mass flow of steam. In order to improve the adaptation of the furnace performance to the steam output requirement, and to influence the composition of the exhaust gas, it is suggested to detect a three-dimensional distribution of the fuel mass on at least a part of the grate. The fuel mass contour is scanned by radar or by directing a plurality of video cameras on the fuel mass at different angles, and the amount of energy locally released by combustion in individual zones is deduced. In general, the availability of the corresponding on-line temperature measurements opened the way to novel control schemes trying to imitate an operator of the combustion plant, and based e.g. on neural networks or fuzzy logic as described in the article "A neuro-fuzzy adaptive control strategy for refuse incineration plants" by B. Krause et al., Fuzzy Sets and Systems 63, pp 329-338, 1994.

DETAILED DESCRIPTION

Exemplary embodiments are directed to an automated, real-time control of a waste incineration plant treating waste of variable composition, for maintaining a desired steam set point or steam output level.

According to the invention, the steam production in a waste combustion process is controlled by determining waste feed rate control values from a relation approximating the steam flow as a sum of independent steam contributions depending on operational parameters that are accessible in real-time. The operational parameters include process inputs such as mass flows of primary and secondary combustion air, as well as process states such as waste and flame temperatures. The independent steam contributions are inspired by the real physical part-processes and account for the strong non-linearity of the combustion process in the operational parameters. They are multiplied by process-specific, a-priori unknown regression coefficients accounting for all kinds of uncertainties or variations in the combustion process. Hence, the proposed polynomial approximation of the steam flow separates the contributions depending in a non-linear way on the measured process inputs and states from a limited number of linear regression coefficients that are nevertheless capable of capturing all possible variations of the waste composition if properly chosen. The process-specific values of a number N' of the coefficients are derived or tuned in a training step from N data sets comprising operational values, i.e. values measured during operation of the specific incineration plant, of the operational parameters and corresponding steam flows.

In an advantageous embodiment of the invention, the operational values of the data sets that are evaluated in order to derive a relation or expression relating the steam flow to the operational parameters comprise values of a waste temperature or a combustion temperature.

In a preferred embodiment of the invention, a time delay between a waste feed control action and its effect on the steam production is estimated and accounted for by including in the data sets correspondingly earlier values of the waste feed rate.

Preferably, the individual steps or functional modules of the method according to the invention are implemented as programmed software modules or procedures. The computer program code of the software modules is stored in a computer program product for controlling one or more processors of a waste incineration control system, particularly, in a computer program product including a computer readable medium containing therein the computer program code means.

BRIEF DESCRIPTION OF THE DRAWINGS

The subject matter of the invention will be explained in more detail in the following text with reference to preferred exemplary embodiments which are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION OF PREFERRED EMBODIMENTS

Figure 1:
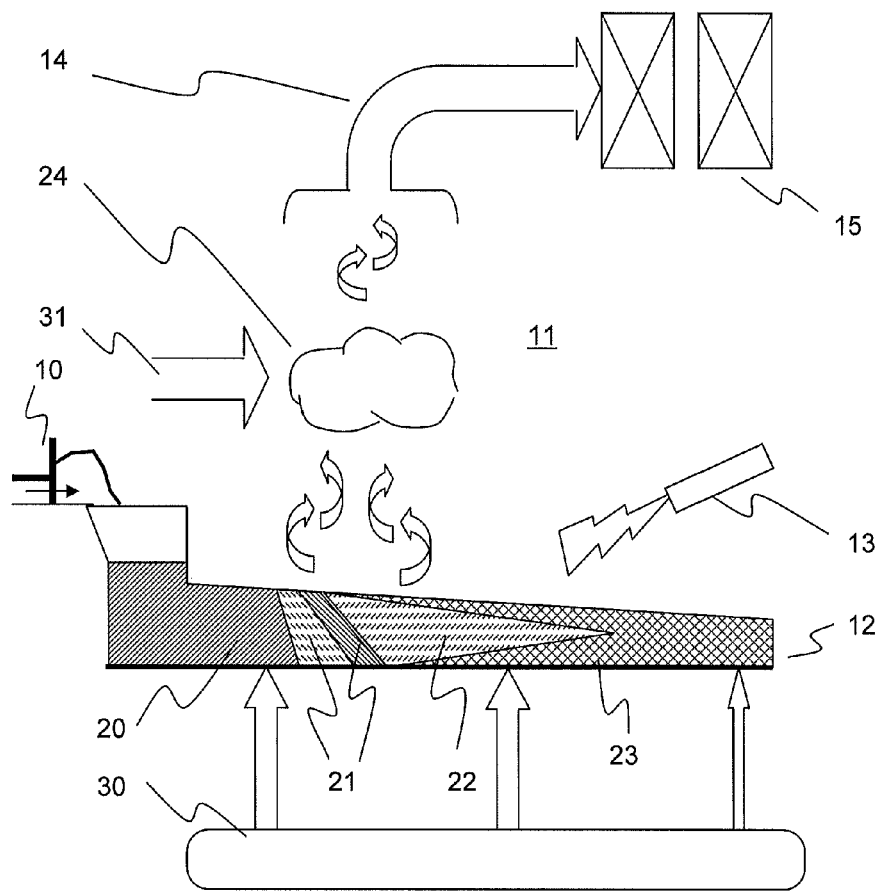
FIG. 1 schematically shows a waste incineration plant.

FIG. 1 schematically shows a waste incineration plant with a number of basic components. An input feed mechanism or actuator 10 introduces the municipal or industrial waste, garbage or other debris into a furnace 11 and places the former on a supported movable grate 12 at a particular waste feed rate $w_0$, thereby forming a waste bed. The grate 12 generally comprises some oppositely moving grate plates to spread and mix the waste and forward it along the grate 12. Auxiliary burners 13 may be provided in order to start or support the combustion processes. The combusted flue gases are collected in a flue gas tract or flue gas channel 14 upstream of the furnace 11 and guided to a boiler or steam generator 15.

Without loss of generality, the incineration process is divided into four zones to be serially traversed by the waste: Drying zone 20, first combustion zone for pyrolysis and gasification/volatilization 21, residual zone for char oxidation or solid combustion 22, and ash treatment/sintering zone 23. These zones are actually not very well separated in the furnace and can overlap to a certain extent. A second combustion zone or flame zone 24, where the homogeneous gas phase combustion of the pyrolysis gases takes place, is identified above the waste bed. Primary air 30 is fed from below the grate in generally different amounts to the four abovementioned zones 20, 21, 22, 23. Secondary air 31 is fed above the grate to ensure complete combustion of the gasification and pyrolysis products in the second combustion zone 24.

In order to assess the steam flow in a somewhat systematic way, different kinds of energy balances are considered. First, assuming complete combustion of the fuel, no losses and unitary boiler efficiency, the total energy contained in the steam is equal to the sum of the energy in the waste and that of the combustion air. Accordingly, the energy balance can be written as $$\dot{m}_{steam}H_{steam}(T_{steam},P_{steam})=[w_0 \cdot \eta LHV + u_2(1)H(u_2(2)) + u_3(1)H(u_3(2))] \quad \text{(eq. 1)}$$

wherein
$\dot{m}_{steam}$ steam flow, [kg/s]
$H_{steam}$ steam enthalpy, [kJ/(kg K)]
$w_0$ waste feed rate or fuel flow, [kg/s]
$\eta$; $0 \leq \eta \leq 1$ waste conversion efficiency
LHV Lower Heating Value of the waste [kJ/kg]
$u_2=[u_2(1), u_2(2)]$ primary air (mass flow, temperature), [kg/s]
$u_3=[u_3(1), u_3(2)]$ secondary air (mass flow, temperature), [kg/s]
H air enthalpy at the respective air temperature, [kJ/(kg K)]

Accordingly, if the product $\eta \cdot LHV$ were known, it would be possible to determine the waste feed rate $w_0$ for a given, or a required, steam flow $\dot{m}_{steam}$. However, as the auxiliary quantity $\eta$ is only indirectly accessible, said product cannot be determined with sufficient precision.

Second, the steam production can likewise be expressed in terms of an energy balance over the boiler as $$\dot{m}_{steam}H_{steam}(T_{steam},P_{steam})=\tilde{\eta}\dot{m}_{gas}(u_2,u_3,d_{1,gas}(x_{LL},u_2),G_{cm}(X_{GC},u_2))H_{gas}(x_{GC}) \quad \text{(eq. 2)}$$

wherein, in addition to eq. 1,
$\tilde{\eta}$; $0 \leq \tilde{\eta} \leq 1$ boiler efficiency
$\dot{m}_{gas}$ gas flow
$x_{GC}$ flame (Gas Cloud) temperature [K]
$x_{LL}$ waste (Lower Layer, combustion zone) temperature, [K]

Eq. 2 is strongly nonlinear and the influence of the incoming waste feed rate $w_0$ is not clearly identifiable.

In order to avoid the respective drawbacks of the first and second approach above, an attempt is made to derive an expression for the steam flow rate $\dot{m}_{steam}$ in a semi-heuristic way. To this end, eq. 1 and eq. 2 are replaced by a polynomial having the general form $$\dot{m}_{steam} = \sum_{i}^{N'} \varphi_i(u_2, u_3, x_{LL}, x_{GC}, w_0) \cdot \theta_i, \quad \text{(eq. 3)}$$

where $\theta_i$ are regression coefficients and $\phi_i$ are individual steam contributions. In other words, the steam flow rate is approximated as a linear combination of distinct steam contributions, each of which depends on operational parameters in distinct way inspired by the physical origin of the respective steam contribution or its corresponding heat source as detailed below.

According to the invention, any uncertainty based on the unknown quantities from eq. 1 and eq. 2 are incorporated in the regression coefficients $\theta_i$. Eq. 3 is nonlinear in the operational parameters, i.e. the process inputs $u_2$, $u_3$, $w_0$ and the process states $x_{LL}$, $x_{GC}$, but it is linear in the regression coefficients $\theta_i$. This particular form of eq. 3 allows estimating the regression coefficients $\theta_i$ on-line without excessive computational power using e.g. a Recursive Least Square (RLS) method as detailed in the following.

Figure 2:
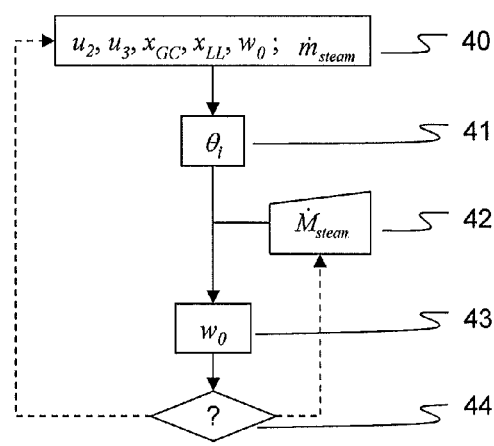
FIG. 2 depicts a flow chart of a method of determining a waste feed rate.

FIG. 2 depicts the steps of controlling a waste incineration process according to the invention. In step 40, during operation of the waste incineration plant, operational values of the operational parameters $u_2$, $u_3$, $x_{GC}$, $x_{LL}$, $w_0$ (or the respective control signals and sensor output signals) as well as a value of a corresponding steam flow rate $\dot{m}_{steam}$ are measured repeatedly, thus forming a total of N data sets. Subsequently, in step 41, these data sets are evaluated to identify $N' \leq N$ regression coefficients $\theta_i$ of a regression relation relating the steam flow rate to the operational parameters. In step 42, a set-point or target $\dot{M}_{steam}$ of the steam output flow is provided. In step 43, a control value of the waste feed rate $w_0$ is calculated by solving the regression relation with said set-point and present values of all operational parameters except $w_0$. The control value is finally applied to a waste feed actuator 10 of the waste incineration plant. Step 44 designates the possibility that new data sets may be available regularly or occasionally, necessitating an update of the regression coefficients, or that a new set point or a changing present value of an operational parameter requires a recalculation of the waste feed rate. Regarding the former possibility, the greater the diversity or variability of the data sets to be evaluated, the more trustful will be the regression coefficients $\theta_i$ resulting there from when it comes to dynamic fuel variations.

A somewhat refined version according to an exemplary embodiment of the present invention has the form $$\dot{m}_{steam}=(\theta_1\phi_1+\theta_2\phi_2+\theta_3)\cdot c_p\cdot x_{GC}+\theta_4 \quad (\text{eq. 3'})$$

where steam contributions take the form $$\varphi_1 = (u_2(1) + u_3(2))^n, n \approx 1.8, \text{ and}$$

$$\varphi_2 = w_o \cdot A_1 e^{-\frac{E_2}{Rx_{LL}(2)}} \cdot A_2 e^{-\frac{E_2}{Rx_{GC}}}.$$

The first steam contribution, denoted by $\phi_1$, represents the influence of the primary and secondary air, whereas the second steam contribution, denoted by $\phi_2$, represents the influence of the combustion gases originating from the solid and gaseous combustion. The latter contribution comprises a first exponential term giving the combustion rate of the solid phase as a function of the waste temperature $x_{LL}$, and a second term giving the combustion rate of the gaseous phase as a function of the flame temperature $x_{GC}$. Furthermore, $c_p$ is a flue gas specific heat [kJ/kg K], and
$A_1, A_2, R, E_1, E_2$ are constants known from literature, such as the article "Heterogeneous kinetics of coal gasification and combustion" by M. Laurendau, Progress in Energy Combustion Science Vol. 4, pp. 221-270, Pergamon Press 1978.

In this approach, the steam flow $\dot{m}_{steam}$ depends linearly on the waste feed rate $w_0$, i.e. $\dot{m}_{steam}=M(\theta)+w_0 N(\theta)$. This relation can thus be solved analytically for the waste feed rate, which for a given steam set point $\dot{m}_{steam}$ determined by steam delivery or energy output contracts can be calculated in a straightforward way. On the other hand, it is to be noted that any approach involving less operational parameters (e.g. $\theta_1+w_0\theta_2$ involving no process inputs or states at all other than $w_0$), and in particular an approach that neglects the temperatures $x_{GC}$ and $x_{LL}$, has proven to be less successful. Hence, the semi-heuristic model of eq. 3 must not be oversimplified.

Figure 3:
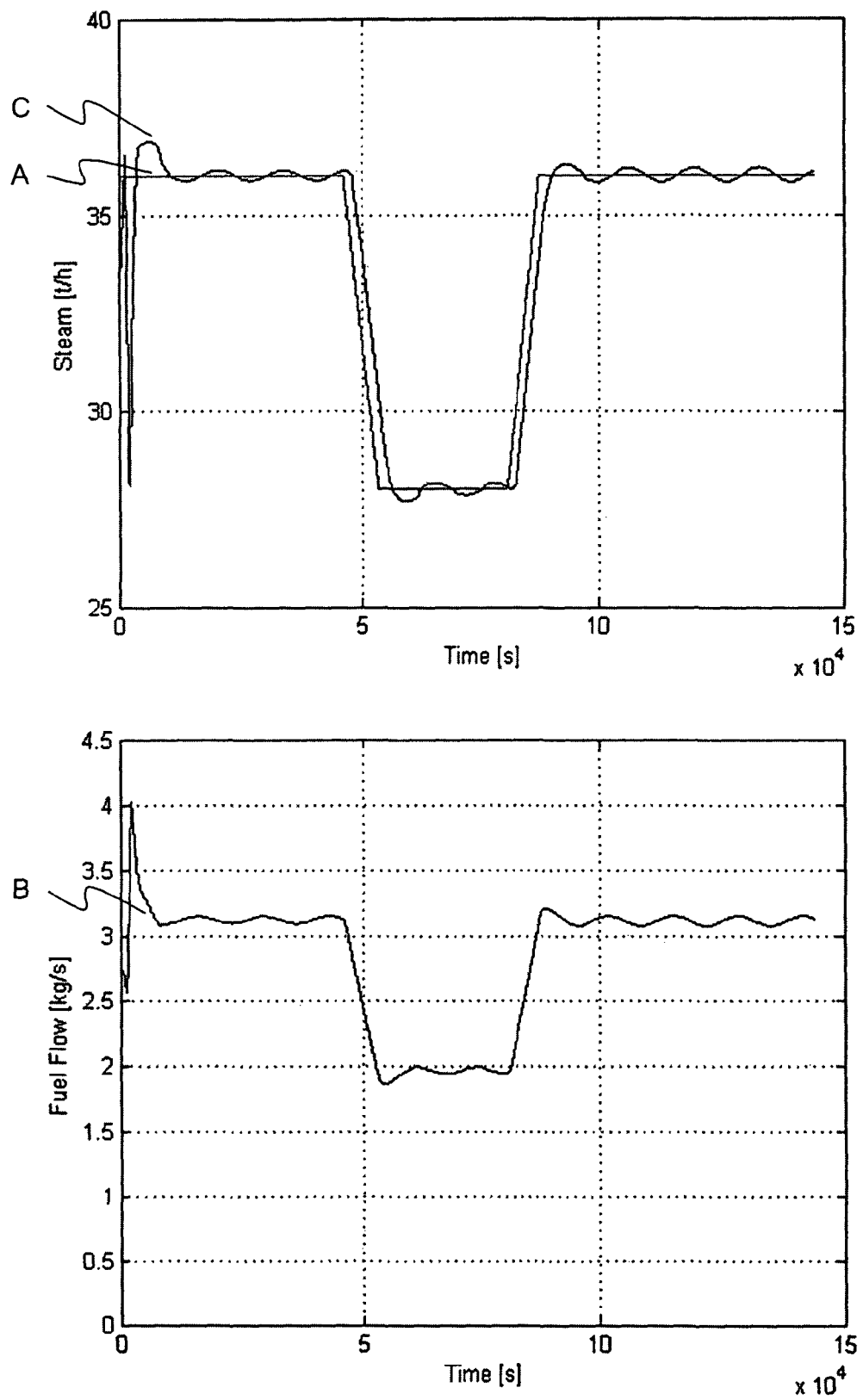
FIG. 3 is a graph showing a controlled steam flow against the steam flow set point.

FIG. 3 shows the result of a simulation that has been run using MATLAB Simulink in order to test the feasibility of the proposed control scheme. A constant waste composition and a steam flow set point $\dot{M}_{steam}$ (top graph, curve A) changing occasionally from a first value to a second value and back were assumed. The method according to the present invention was then applied to a waste combustion process that was itself modeled using a waste combustion model of reasonable complexity. The waste feed rate $w_0$ (bottom graph, curve B) controlled as detailed in the foregoing and the actual steam flow (top graph, curve C) resulting there from are likewise depicted and demonstrate that after a few initial oscillations, the steam flow set point is followed quite accurately.

As there is a delay between the feeding of the waste onto the grate and its effect on the steam production, a corresponding delay time $\Delta$ is introduced into the relations above. This time delay can be in the order of up to one hour, and physically relates to the waste residence time in the initial grate zone. The aforementioned linear relation then reads $$\dot{m}_{steam}=M(\theta)+w_0(t-\Delta)N(\theta) \quad (\text{eq. 4})$$

Hence, in a preferred variant, the time delay $\Delta$ is estimated, and a correspondingly earlier value of the waste feed rate $w_0$ is associated to the measured values of the operational parameters for the purpose of estimating the coefficients $\theta_i$.

LIST OF DESIGNATIONS

| | |
|---|---|
| 10 | actuator |
| 11 | furnace |
| 12 | grate |
| 13 | auxiliary burner |
| 14 | flue gas tract |
| 15 | boiler |
| 20 | drying zone |
| 21 | first combustion zone |
| 22 | residual zone |
| 23 | ash treatment zone |
| 24 | second combustion zone |
| 30 | primary air |
| 31 | secondary air |

The invention claimed is:

1. A method of controlling a waste combustion process, comprising:
   a) providing a plurality of data sets each including operational values of a number of operational parameters ($u_2$, $u_3$, $x_{GC}$, $x_{LL}$, $w_0$) of the combustion process and of a corresponding value of a steam flow ($\dot{m}_{steam}$) generated by the combustion process wherein:
   $u_2$=primary air (mass, temperature)
   $x_{GC}$=flame (Gas Cloud) temperature
   $u_3$=secondary air (mass, temperature)
   $x_{LL}$=waste (Lower Layer Combustion Zone) temperature;
   $w_0$=waste feed rate;
   b) evaluating said plurality of data sets and deriving a relation between the steam flow ($\dot{m}_{steam}$) and the operational parameters ($u_2$, $u_3$, $x_{GC}$, $x_{LL}$, $w_0$);
   c) using a microprocessor coupled to a memory for solving, given a desired steam flow set point ($\dot{M}_{steam}$), said relation for a control value of the waste feed rate ($w_0$); and
   d) applying said control value to a waste feed actuator of the combustion process, wherein the evaluating includes:
   deriving values of a number of regression coefficients ($\theta_i$) for multiplication in a polynomial relation of a form $$\dot{m}_{steam} = \sum_{i}^{N'} \varphi_i(u_2, u_3, x_{LL}, x_{GC}, w_0) \cdot \theta_i,$$

with a number of steam contributions ($\phi_i$) depending on the operational parameters ($u_2$, $u_3$, $x_{LL}$, $x_{GC}$, $w_0$).

2. The method according to claim 1, comprising:
   estimating a delay time ($\Delta$) characteristic of a time delay between the application of said control value to the waste feed actuator and a resultant effect on steam production; and
   wherein the data sets each include operational values of a number of the operational parameters ($u_2$, $u_3$, $x_{GC}$, $x_{LL}$) measured at a time t and a value of the waste feed rate ($W_O$) measured at a time t–$\Delta$ preceding the time t by the delay time ($\Delta$).

3. The method according to claim 1, comprising:
   repeating a-d and deriving updated values of the regression coefficients ($\theta_i$) on-line during controlling a waste combustion process.

4. A computer program stored on a non-transitory computer readable medium for causing a computer to execute the method according to claim 1 for controlling a waste combustion process.

5. A system for controlling a waste combustion process, comprising:
- means for deriving, from a plurality of data sets each including operational values of a number of operational parameters ($u_2$, $u_3$, $x_{GC}$, $x_{LL}$, $w_0$) of the combustion process wherein:

$u_2$=primary air (mass, temperature)
$X_{GC}$=flame (Gas Cloud) temperature
$u_3$=secondary air (mass, temperature)
$X_{LL}$=waste (Lower Layer Combustion Zone) temperature;
$W_0$=waste feed rate;

and of a corresponding value of a steam flow ($\dot{m}_{steam}$) generated by the combustion process, the values of a number of regression coefficients ($\theta_i$) that multiply, in a polynomial relation of the form $$\dot{m}_{steam} = \sum_i^{N'} \varphi_i(u_2, u_3, x_{LL}, x_{GC}, w_0) \cdot \theta_i,$$

a number of steam contributions ($\phi_i$) depending on the operational parameters ($u_2$, $u_3$, $x_{GC}$, $x_{LL}$, $w_0$), and
- means for solving, given a desired steam flow set point ($\dot{M}_{steam}$), said relation for a control value of the waste feed rate ($w_0$) and applying said control value to a waste feed actuator of the combustion process.

6. The system according to claim 5, comprising means for measuring operational values of the temperatures ($x_{GC}$, $x_{LL}$) of the combustion process.

\* \* \* \* \*